United States Patent
Qiang et al.

(10) Patent No.: US 9,087,545 B2
(45) Date of Patent: Jul. 21, 2015

(54) REQUEST MANAGEMENT FOR ROTATING DATA STORAGE MEDIA

(71) Applicant: Seagate Technology LLC, Cupertino, CA (US)

(72) Inventors: Jian Qiang, Singapore (SG); KongQun Yang, Singapore (SG); YongPeng Chng, Singapore (SG); TseJen Lee, Singapore (SG)

(73) Assignee: Saegate Technology LLC, Cupertino, CA (US)

( * ) Notice: Subject to any disclaimer, the term of this patent is extended or adjusted under 35 U.S.C. 154(b) by 0 days.

(21) Appl. No.: 13/943,381

(22) Filed: Jul. 16, 2013

(65) Prior Publication Data

US 2015/0022918 A1 Jan. 22, 2015

(51) Int. Cl.
*G11B 19/04* (2006.01)
*G11B 20/10* (2006.01)

(52) U.S. Cl.
CPC ............ *G11B 19/042* (2013.01); *G11B 19/044* (2013.01); *G11B 20/10527* (2013.01); *G11B 2020/10731* (2013.01); *G11B 2020/10824* (2013.01)

(58) Field of Classification Search
None
See application file for complete search history.

(56) References Cited

U.S. PATENT DOCUMENTS

| | | | |
|---|---|---|---|
| 5,847,476 A | 12/1998 | Elsing et al. | |
| 6,229,668 B1 | 5/2001 | Huynh et al. | |
| 6,534,890 B2 | 3/2003 | Rafaelof | |
| 7,477,477 B2 | 1/2009 | Maruchi et al. | |
| 7,565,226 B1 | 7/2009 | Cooley et al. | |
| 7,890,278 B2 | 2/2011 | Vacar et al. | |
| 8,194,340 B1 * | 6/2012 | Boyle et al. | 360/48 |
| 8,254,050 B2 | 8/2012 | Vaidyanathan et al. | |
| 2006/0072241 A1 * | 4/2006 | Feliss et al. | 360/97.02 |
| 2008/0024899 A1 * | 1/2008 | Chu et al. | 360/69 |
| 2008/0158715 A1 * | 7/2008 | Hirano et al. | 360/75 |
| 2008/0209103 A1 * | 8/2008 | Haga | 711/100 |
| 2010/0024555 A1 | 2/2010 | Gross et al. | |
| 2010/0195243 A1 * | 8/2010 | Zhu et al. | 360/73.03 |
| 2010/0202078 A1 * | 8/2010 | Sato | 360/31 |
| 2010/0214687 A1 * | 8/2010 | Yamakawa | 360/77.02 |
| 2010/0329088 A1 | 12/2010 | Kayanuma | |
| 2012/0300329 A1 * | 11/2012 | Benhase et al. | 360/39 |

FOREIGN PATENT DOCUMENTS

WO 01/14835 A1 3/2001

* cited by examiner

*Primary Examiner* — Wayne Young
*Assistant Examiner* — Mark Fischer
(74) *Attorney, Agent, or Firm* — Hall Estill Attorneys at Law

(57) ABSTRACT

A data storage system and associated method of use may generally be directed to a memory cache that stores a plurality of pending read and write requests. A processor can be configured to prioritize the read requests in the memory cache in response to a sensed acoustic or mechanical vibration in a data storage medium.

20 Claims, 4 Drawing Sheets

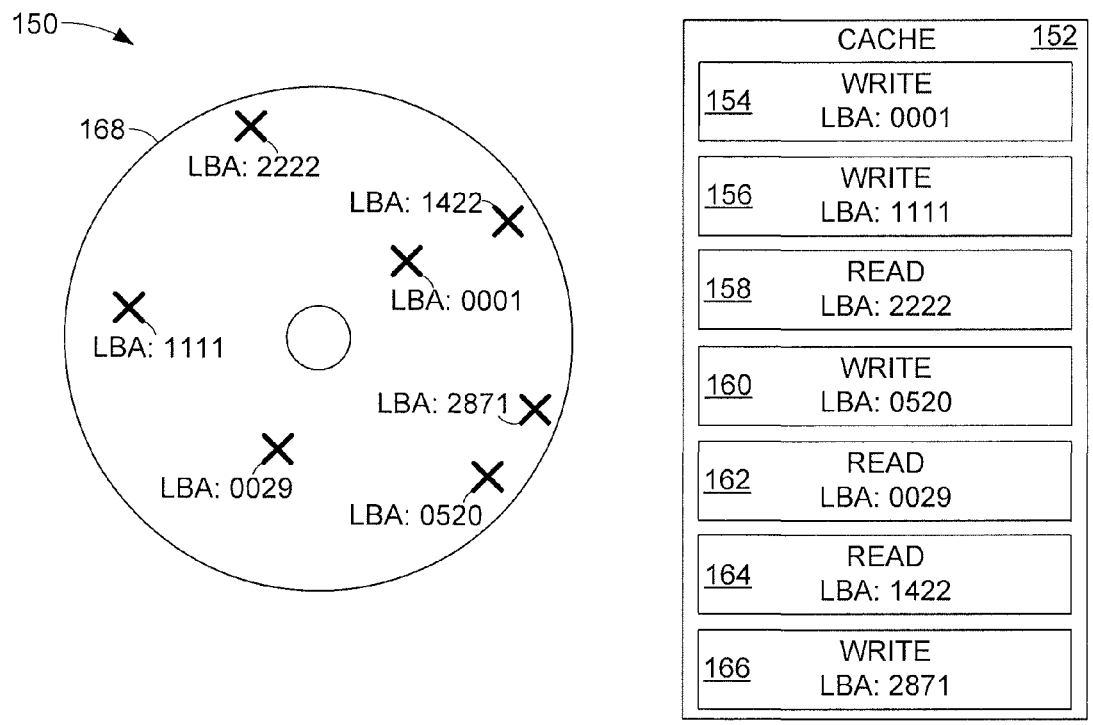
FIG. 3
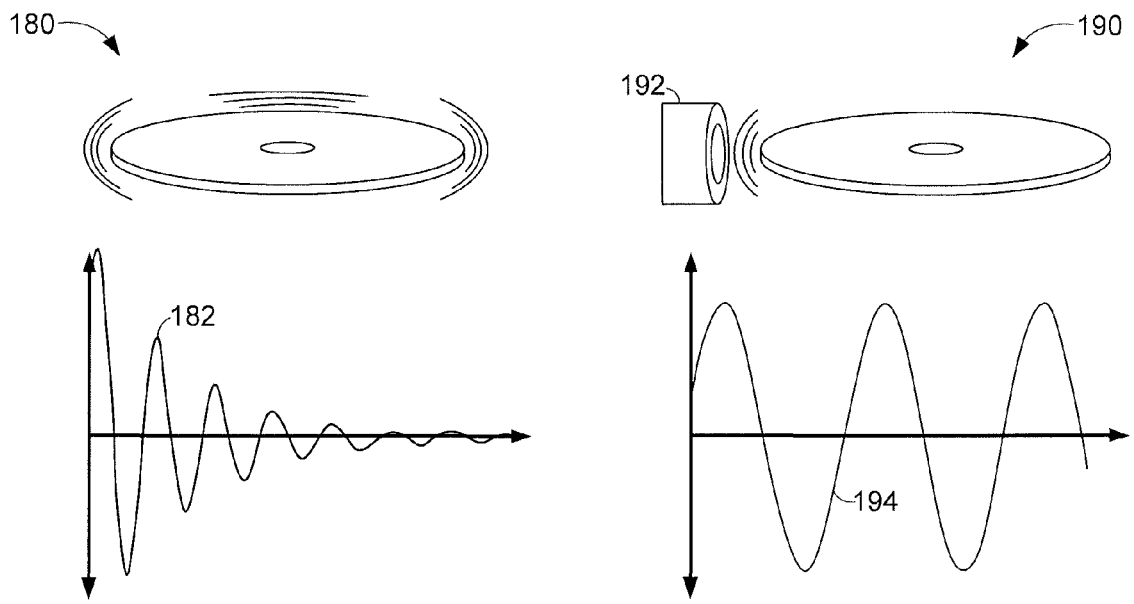
FIG. 4A
FIG. 4B

REQUEST MANAGEMENT FOR ROTATING DATA STORAGE MEDIA

SUMMARY

A data storage system may generally be capable of reading and writing data in various data storage environments.

In accordance with some embodiments, a memory cache can store a plurality of read and write requests while a processor is configured to prioritize the read requests in response to a sensed vibration in a data storage medium.

BRIEF DESCRIPTION OF THE DRAWINGS

FIG. 3 shows a block representation of portions of an example data access assembly capable of being used in the data storage device of FIG. 2.

FIGS. 4A and 4B respectively illustrate block representations of example data disk vibrations in accordance with some embodiments.

DETAILED DESCRIPTION

The proliferation of mobile electronics with sophisticated data storage, processing, and hardware configurations has stressed the physical capabilities of some electrical components. Close physical proximity of rotating data storage systems with acoustic vibration producing means, such as speakers and bearings, can induce performance delays and errors for programming data in a data storage system. Although impact, shock, and mechanical vibrations can be mitigated and blocked via dampening mechanisms, acoustic vibrations can be difficult to mitigate, especially in continuous, long-term resonance frequency environments. Such an acoustic vibration environment can limit mobile device performance, which explains the continued industry emphasis on mitigating acoustic vibration effects on data access to a rotating data media.

Accordingly, a mobile electronics device may have a plurality of data read and write requests present in a memory cache that is controlled by a processor that prioritizes read requests over write requests in response to a sensed vibration in a data storage medium. The prioritization of data reads can optimize mobile electronics device performance by minimizing data access delays caused by data write requests that have failed due to the presence of data medium vibration. Various embodiments may combine the prioritization of read requests with modified data medium conditions, such as rotational speed and air bearing size, to further optimize data access performance with high data reading accuracy.

Figure 1:
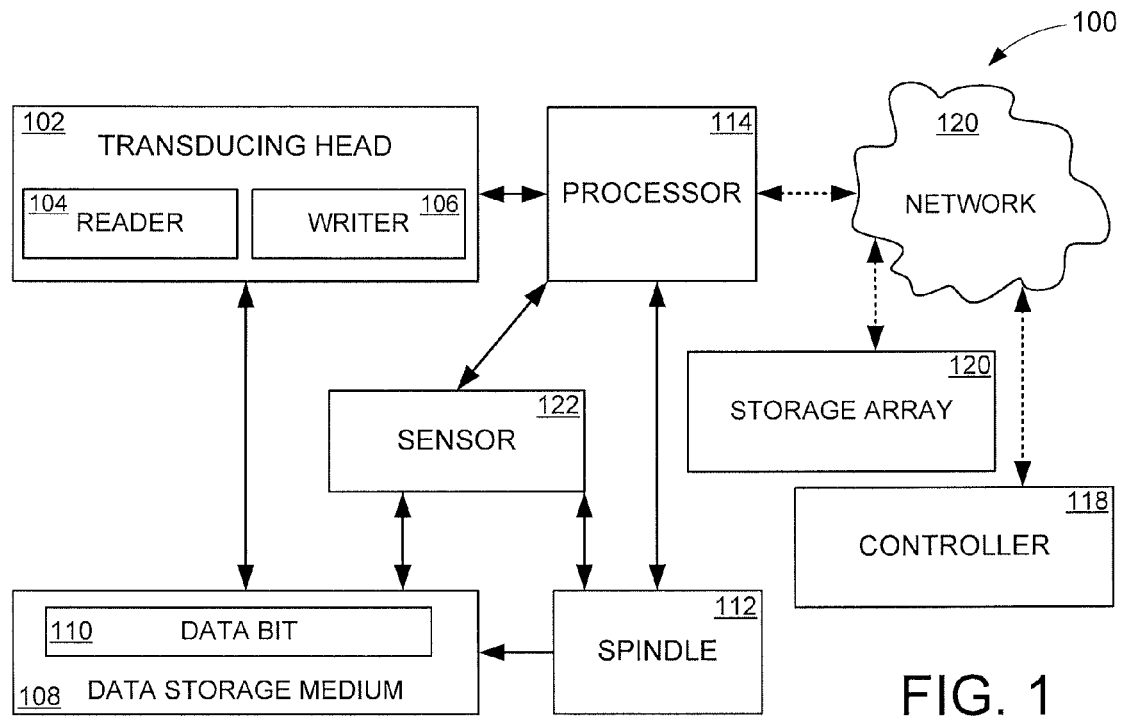
FIG. 1 is a block representation of an example data storage system configured and operated in accordance with some embodiments.

FIG. 1 displays a block representation of an example data storage system 100 that may experience expected and unexpected vibrations in accordance with various embodiments. The data storage system 100 is shown in a non-limiting configuration where a transducing head 102 is equipped with a data reader 104 and data writer 106 that can respectively be positioned over a variety of locations on a magnetic storage medium 108, such as over one or more stored data bits 110. The storage medium 108 can be attached to one or more spindle motors 112 that rotate the medium 108 to produce an air bearing on which the transducing head 104 flies to access predetermined portion of the medium 108. In this way, one or more local or remote processors 114 can provide controlled motion of the transducing head 102 and spindle 112 to adjust and align the reader 104 and writer 106 with selected data bits 110.

The advent of wireless network computing has allowed the processor 114 access to one or more remote data storage arrays 116 and controllers 118 over a network 120. The remote controller 118 and local processor 114 can act independently or concurrently to monitor and control one or more sensors 122 that continuously or sporadically provide operating conditions of the data storage medium 108, like vibration and temperature, as well as the spindle 112, such as rotational speed and power consumption. The ability to monitor and adapt the operating conditions of the data storage system 100 allows the processor 114 and remote controller 118 to conduct corrective algorithms to limit data access errors and optimize data access time.

Figure 2:
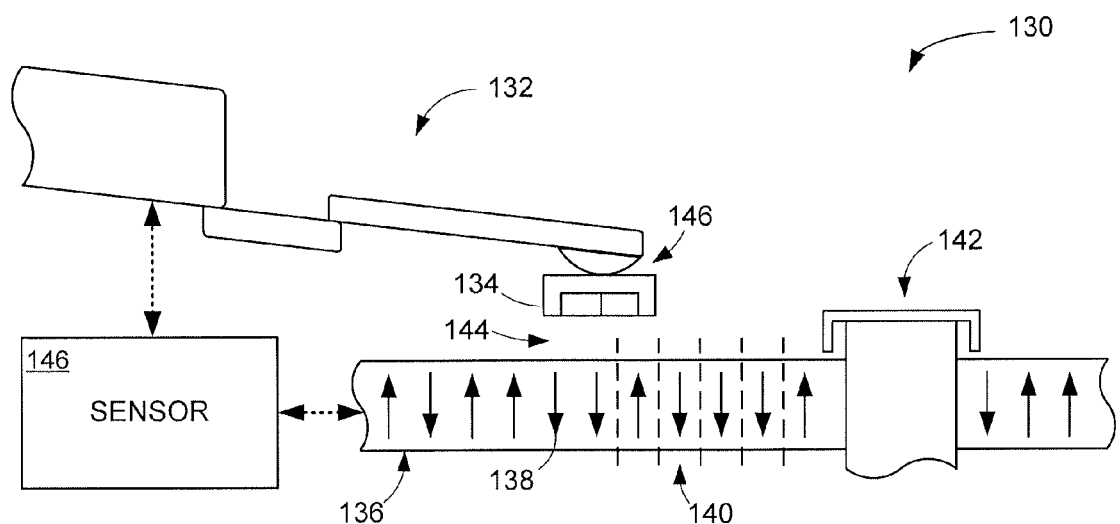
FIG. 2 displays a block representation of a portion of an example data storage device capable of being used in the data storage system of FIG. 1.

FIG. 2 shows a block representation of a portion of an example data storage device 130 that may be used in the data storage system 100 of FIG. 1 in accordance with various embodiments. Through controlled actuation of an actuator 132, a transducing head 134 can be moved over a variety of locations on a magnetic storage medium 136 where stored data bits 138 are positioned in predetermined patterns, such as radially concentric tracks 140 or bit patterns (BPM). Movement of the storage medium 136 can be facilitated through attachment to one or more spindle motors 142 that rotate during use to produce an air bearing 144 on which the transducing head 134 flies.

The transducing head 134 has a magnetic writer and magnetically responsive reader that may each have one or more magnetic shields that operate to program and read data from the selected data bits 138 of the storage medium 136, respectively. As data bits 138 become more densely packed on the storage media 136, scaling the physical size of the transducing head 134 can increase data bit resolution, but may increase the susceptibility of the device 130 to data programming errors, especially in situations where the sensor 146 indicates undamped vibrations are occurring in the data storage medium 136 such as acoustic noise induced vibrations at a resonance frequency.

FIG. 3 generally illustrates a block representation of portions of an example data storage device 150 configured in accordance with some embodiments. The memory cache 152 may be present in temporary and permanent storage locations, such as volatile and non-volatile memory cells, that are controlled by at least one processor and/or controller to establish a command queue of read and write requests 154, 156, 158, 160, 162, 164, and 166, as shown. The command queue can be organized in an unlimited variety of manners, such as first in first out (FIFO), by size, by access times, by error rates, by logical block address (LBA), and by physical block address (PBA), of the requests in association with at least one associated data storage medium 168.

While a grouping of data write and read requests may be present in the command queue with LBAs in close physical proximity on the data storage medium 168, such command queue condition is rare. More commonly, a wide variety of physical locations are to be accessed by the requests in the command queue, similar to the diverse physical locations shown on medium 168. Such a variety of physical data access locations corresponds with transducer seeks with increased data access times, especially for write requests where alignment with a single data track and precise data sector of the medium 168 is needed to ensure stored data integrity. The movement and alignment of the transducer with various different locations on the data storage medium 168 may be complicated by the presence of damped and undamped vibrations.

FIGS. 4A and 4B respectively provide visual and graphical representations of different kinds of vibrations that may be experienced individually and concurrently during the operation of a data storage device. Data medium 180 is shown experiencing mechanical vibration that may be associated with any number of physically connected components operating during changing physical conditions. For example, impact, shock, power failure, balance change, and physical orientation modification can induce mechanical vibrations in the data medium 180 that are damped by the physical connection of differently weighted and balanced components. Such damped vibration is graphed by line 182 that shows the reducing amplitude of vibration as the size, weight, and balance of the physical components counteract the mechanical vibration.

In contrast, acoustic vibrations can be undamped and continue at one or more amplitudes over time. Data medium 190 displays such a condition where an electrotransducer 192 produces sound waves that induce vibration in the data medium without physical contact. With the electrotransducer 192 potentially capable of producing acoustic waves from 10 Hz to 10,000 Hz, one or more resonance frequencies of the data medium can be encountered that allow the vibrations to be exaggerated over time. The potential for violent vibrations with resonance frequency acoustic vibrations and prolonged exposure to non-resonance undamped vibrations can be particularly hazardous to rotating data storage media where transducing means fly on nanometer scale air bearings to access data. For example, close physical proximity of a rotating data medium to a loudspeaker, such as in a laptop, tablet computer, and smartphone, can induce hours of acoustic waves and vibrations that may correspond with interrupted music playing, system errors, and data programming defects.

Figure 5:
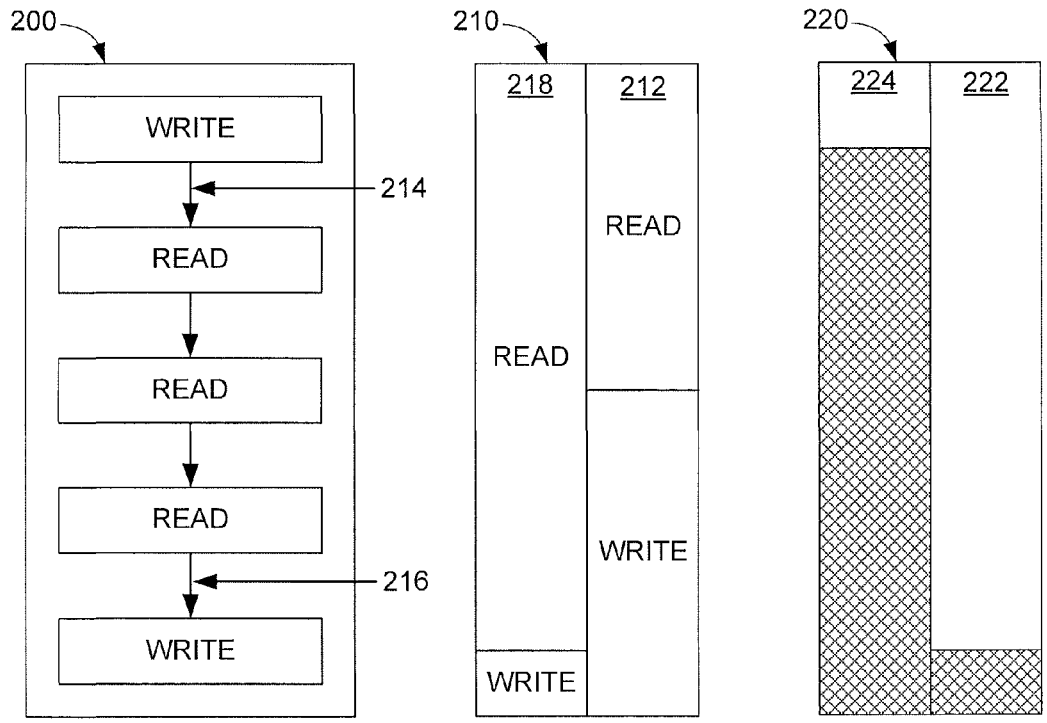
FIG. 5 provides block representations of portions of a memory cache capable of being used in the data storage device of FIG. 3.

FIG. 5 displays a block representation of an example mobile computer system configured in accordance with various embodiments. A number of read and write requests are shown in a command queue that is resident in a physical memory cache 200. The command queue can be organized, in some embodiments, with a random or FIFO structure while other embodiments position read requests between write requests, which may utilize excess rotational latency in the data medium to conserve power. Organization of the command queue with alternating read and writes requests can provide a transducing head bandwidth 210 balance that is illustrated by ratio 212.

The half read, half write bandwidth model of ratio 212 can also allow optimization of the transducing head's position over a data storage medium to conduct read operations on data sectors in close physical proximity. However, the occurrence of an expected and unexpected event 214, like vibration, shock, and power loss, can degrade system performance as write operations take more time to complete and are immediately retried at the expense of execution of the next queued read request. Buffer region 220 and ratio 222 illustrate how a memory buffer can be minimally filled as a result of delayed read operations delayed by data medium vibrations during write operations. Such unfilled buffer region 220 can correspond to inhibited system performance such as delayed data streaming and interrupted flow of data during various operations like data uploading, downloading, and executing software.

In accordance with some embodiments, the occurrence of event 214 induces a controller and/or processor to reorganize the command queue so that read requests are exclusively conducted until a rectifying event 216, like subsiding vibrations, is experienced. The reorganization of the command queue after event 214 is not required as a controller can accomplish the same exclusive read request execution by skipping write requests. Regardless of how the read requests are prioritized after event 214, operating ratio 218 shows how the bandwidth 210 of data accesses favors read operations over the execution of write requests. Buffer 220 and ratio 224 illustrate how the asymmetric execution of the command queue to favor read requests can minimize data access delays and allow the buffer to be largely or completely filled. A buffer that has a majority of its capacity filled with pending request data, as shown in ratio 224, allows for high data throughput that can correspond with optimized bandwidth for data intensive applications like multimedia streaming and online games.

Figures 6A, 6B:
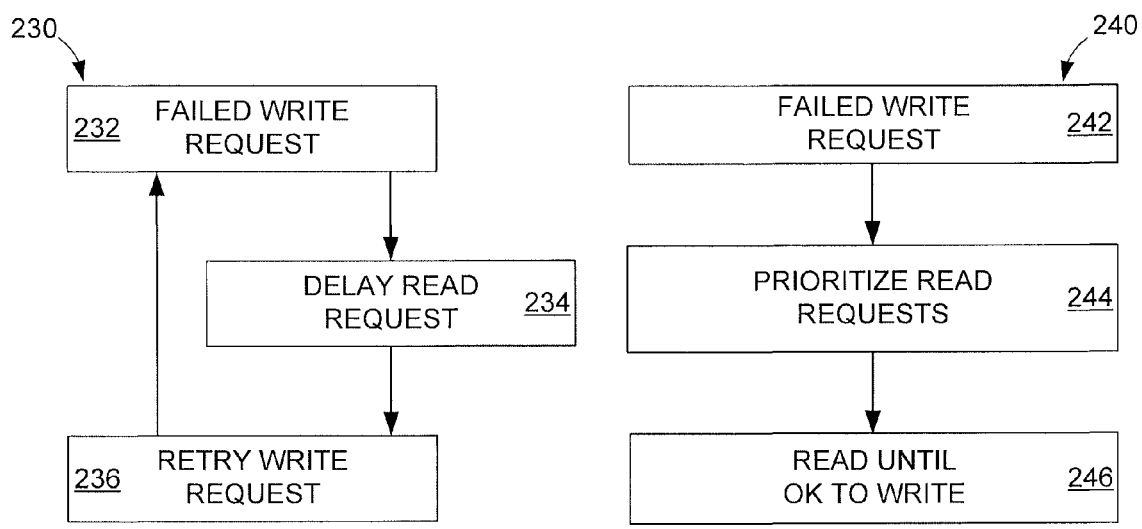
FIGS. 6A and 6B respectively display logical maps for conditions that may be experienced by a data storage system in various embodiments.

FIGS. 6A and 6B respectively provide logical maps 230 and 240 that correspond to various system conditions that may occur in a data storage device. Map 230 begins with a failed write request 232 that may occur for any reason, but is associated with playing music at loud volume in close physical proximity to a data medium in a non-limiting embodiment. The music produces sound waves that induce undamped vibration in the data medium that produces the failed write execution in step 232. The failed execution of the write request 232 could be due to an unlimited number of reasons that, in isolation, would result in minimal system delay as an immediate write retry would successfully write the requested data. However, with undamped vibrations writing errors can persist over time, especially when music continually plays at high volume and at resonance frequencies.

As shown, the failed write request 232 causes the delay of a read request 234 pending in a command queue for the subsequent repeat attempt to write the requested data in step 236. The prolonged nature of undamped acoustic vibrations results in the failed retry of the write request in step 236 and the looping of map 230 back to step 232. Such a write failure and read request delay loop can limit and degrade system performance as the system buffer remains unfilled and system operations are interrupted. While the amplitude and frequency of the undamped vibrations may change and allow a write request to eventually be executed, continued presence of acoustic vibrations will likely induce another costly write request failure loop in the future.

FIG. 6B displays logical map 240 that corresponds with vibration mitigation in accordance with various embodiments. Much like step 232 of map 230 in FIG. 6A, a failed write request occurs at step 242. However, map 240 of FIG. 6B responds to the sensed vibration and/or the failed write by prioritizing read requests in the command queue in step 244. Such prioritization may be conducted by reorganizing the command queue or merely skipping future write requests while all failed write request retries are suspended. Step 246 may continue to execute the prioritized read requests in step 244 until writing operations can reliably begin or resume with vibrations subsiding.

It can be appreciated that the elimination of failed write requests by prioritizing read request in response to sensed data medium vibrations can maximize system resources to provide optimal system performance. It should be noted that the sensing of data medium vibration is not limited to a particular response or action as adaptive vibration sensing can be used to ensure read request prioritization occurs at appropriate times without wasting system resources. That is, an unlimited variety of command queue actions can be taken in response to measured vibrations that exceed a predetermined threshold and jeopardize the performance of a data storage device.

Figure 7:
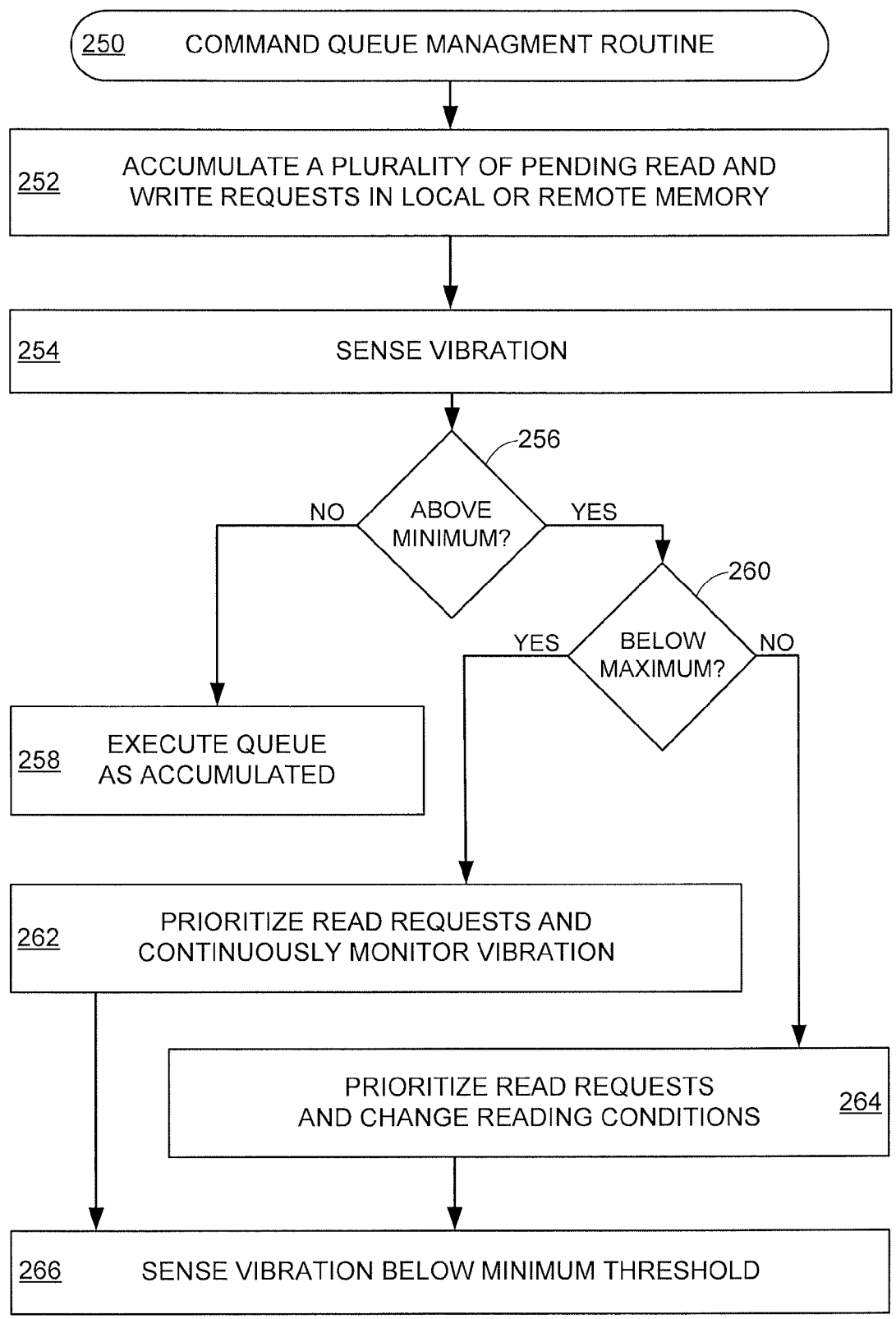
FIG. 7 provides a flowchart of an example data queue management routine carried out in accordance with various embodiments.

FIG. 7 is an example command queue management routine 250 conducted in accordance with various embodiments to provide adaptive vibration sensing for at least one data storage medium. The routine 250 may begin with step 252 accumulating a plurality of pending read and write requests in local or remote memory, such as a buffer and cache. The pending requests can be initially organized in an unlimited variety of manners like FIFO, random, and alternating structures. Step 252 may include the execution of one or more accumulated requests or may not execute a single request prior to step 254 sensing a vibration in at least one data storage medium. That is, the number of previously executed write and read requests does not contribute to the ability to sense vibrations in step 254 with one or more sensors, such as sensor 122 of FIG. 1.

The sensed vibration in step 254 may be one or more types of vibration from one or more vibration sources. For example, the sensed vibration may comprise undamped acoustic vibration from a loudspeaker and damped mechanical vibration from a change in data medium rotational speed. It should be noted that the duration of the sensed vibration may be qualified against a predetermined standard, such as 1 second, to ensure the sensed vibration is continually occurring and not an isolated anomaly.

The sensed vibration may be further qualified against predetermined intensity standards that may or may not have a predetermined duration in decision 256 that evaluates if the vibration is above a minimum threshold value. That is, a sensed vibration of great intensity and short duration may fall above or below the minimum threshold value of decision 256 just as a vibration of relatively low intensity and long duration due to the predetermined time and intensity parameters used to define the threshold value. With such predefined valuation of vibrations, multiple parameters can be accounted for to provide a more complete understanding of what is happening with the data storage medium.

If the vibration sensed in step 254 is below the predefined minimum threshold, step 258 proceeds to execute the command queue as accumulated and organized in step 252, such as having alternating read and write operations. Conversely, a sensed vibration that is above the minimum threshold in decision 256 advances routine 250 to decision 260 where the vibration is evaluated against a maximum threshold. The setting of a maximum threshold can allow vibration affect mitigation to adapt to the degree of vibration being experienced by the data medium. Vibrations that are less than the predetermined maximum threshold has step 262 then prioritize read requests in the command queue while continuously monitoring vibration in the data medium, such as pinging the vibration sensor every millisecond or logging sensed data in real-time.

The continuous monitoring of vibrations can cost system resources, but allows the prioritization of read request to last only as long as the vibrations are between the minimum and maximum threshold values. Without the continued vibration monitoring, read request prioritization may be conducted for an unnecessarily long duration, which can backlog a large number of write requests that can slow system performance when executed serially at a later date. However, if the vibration ever rises above the predetermined threshold value, either at decision 260 or after step 262 begins, step 264 can take further data and data medium protection measures by prioritizing read requests in the command queue while changing reading conditions, such as by slowing data medium rotation or increasing air bearing size between the transducing head and data storage medium.

Step 264 can continuously or sporadically monitor vibration and if the maximum threshold value is exceeded for a predetermined amount of time, such as 1 hour, the data medium can be stopped and all system operations are conducted from cached and buffered data. It is contemplated that steps 262 and 264 are executed in response to the sensed vibrations and as such the routine 250 may conduct each step multiple times until the vibrations subside below the minimum threshold value in step 266.

Through the steps and decisions of routine 250, a system can experience seamless data throughput despite the presence of one or more types of vibration. However, routine 250 is not limited to the steps and decisions shown in FIG. 7 as various steps and decisions can be added, modified, and removed without limitation. For example, a step could be conducted after step 252 and before any vibrations are sensed in step 254 to organize the read and write requests in a predetermined structure in the command queue. In another non-limiting example, a step could cache all pending write requests in a separate memory location in the event a maximum vibration threshold is exceeded so that the command queue exclusively contains read requests.

It can be appreciated that the prioritization of read requests in response to sensed vibrations in a data storage medium can optimize system resources by conducting read operations that are accurate from a vibrating medium instead of write operations that are inaccurate and time consuming. The ability to adapt the amount of vibration monitoring and read request prioritization based on the intensity, type, and duration of the vibration can allow for efficient use of system resources to provide optimized data bandwidth. Moreover, the managing of pending read and write requests in the command queue allows for efficient prioritization of read requests that utilize system buffers to deliver maximum data streaming despite the presence of damped and undamped vibration.

It will be appreciated that the technology described above can readily be utilized in any number of applications, including solid state memory. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising:
a memory cache storing a plurality of pending read and write requests with a first operating ratio having an equal number of read and write requests; and
a processor configured to, in response to a sensed vibration in a data storage medium, limit write commands entering the memory cache to alter the operating ratio, prioritize the existing read requests in the memory cache, and change reading conditions.

2. The apparatus of claim 1, wherein the memory cache is non-volatile memory.

3. The apparatus of claim 1, wherein the processor is connected to the memory cache over a wireless network.

4. The apparatus of claim 1, wherein a plurality of sensors are positioned proximal the data storage medium.

5. The apparatus of claim 1, wherein the reading conditions comprise rotational speed of the data storage medium.

6. The apparatus of claim 1, wherein each read and write request of the plurality of read and write requests has a unique logical and physical block address on the data storage medium.

7. The apparatus of claim 1, wherein the vibration is undamped.

8. The apparatus of claim 1, wherein the vibration is damped.

9. The apparatus of claim 1, wherein the vibration comprises both acoustic and mechanical vibration.

10. A method comprising:
    storing a plurality of pending read and write requests in a memory cache with a first operating ratio having an equal number of read and write requests;
    sensing vibration in a data storage medium;
    limiting write commands entering the memory cache to alter the operating ratio in response to the sensed vibration;
    prioritizing existing read requests in response to the sensed vibration with at least one processor; and
    changing a rotational speed reading condition of the data storage medium with the at least one processor in response to the sensed vibration.

11. The method of claim 10, wherein the plurality of read and write requests are reorganized in the memory cache by the prioritizing step.

12. The method of claim 10, wherein the sensed vibration is qualified for intensity and duration in the prioritizing step.

13. The method of claim 10, wherein the read requests are prioritized to maintain a predetermined amount of data in a buffer.

14. The method of claim 10, wherein the read requests are exclusively conducted subsequent to the sensed vibration.

15. The method of claim 10, wherein at least one write request is conducted after the sensed vibration subsides.

16. The method of claim 10, wherein the sensed vibration is undamped from an acoustic source.

17. The method of claim 16, wherein the sensed vibration is mechanical and originated from a physically connected component.

18. A method comprising:
    storing a plurality of read and write requests in a memory cache with a first operating ratio having an equal number of read and write requests;
    sensing acoustic vibration in a data storage medium;
    limiting write commands entering the memory cache to alter the operating ratio in response to the sensed vibration;
    prioritizing existing read requests in response to the sensed vibration with at least one processor;
    changing a fly height reading condition of a transducing head in response to the sensed vibration; and
    skipping at least one write request to execute a read request.

19. The method of claim 18, wherein the at least one skipped write request is executed after the sensed acoustic vibration subsides.

20. The method of claim 18, wherein the acoustic vibration is from a loudspeaker.

* * * * *